United States Patent
Krishnan et al.

(10) Patent No.: US 11,478,827 B2
(45) Date of Patent: Oct. 25, 2022

(54) SENSOR ASSEMBLY WITH CLEANING

(71) Applicant: Ford Global Technologies, LLC, Dearborn, MI (US)

(72) Inventors: Venkatesh Krishnan, Canton, MI (US); Raghuraman Surineedi, Dearborn, MI (US); Ashley Lucas, Novi, MI (US); Tyler D. Hamilton, Farmington, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 564 days.

(21) Appl. No.: 16/589,520

(22) Filed: Oct. 1, 2019

(65) Prior Publication Data

US 2021/0094079 A1    Apr. 1, 2021

(51) Int. Cl.
| | |
|---|---|
| B08B 3/02 | (2006.01) |
| B60R 16/08 | (2006.01) |
| H04N 5/225 | (2006.01) |
| G02B 27/00 | (2006.01) |
| B60S 1/52 | (2006.01) |
| B60S 1/54 | (2006.01) |
| G02B 13/00 | (2006.01) |
| G02B 7/02 | (2021.01) |
| B08B 1/00 | (2006.01) |

(52) U.S. Cl.
CPC ............... *B08B 3/02* (2013.01); *B08B 1/006* (2013.01); *B60R 16/08* (2013.01); *B60S 1/52* (2013.01); *B60S 1/54* (2013.01); *G02B 7/02* (2013.01); *G02B 13/0015* (2013.01); *G02B 27/0006* (2013.01); *H04N 5/2252* (2013.01)

(58) Field of Classification Search
CPC .. B60S 1/52; B60S 1/54; B60S 1/0848; B08B 3/02; B08B 1/006; G02B 27/0006; G02B 13/0015; G02B 7/02; B60R 16/08; H04N 5/2252
USPC .......................................................... 134/198
See application file for complete search history.

(56) References Cited

U.S. PATENT DOCUMENTS

| | | | |
|---|---|---|---|
| 6,944,908 B2 * | 9/2005 | Hoetzer ................ | B60S 1/0822 |
| | | | 134/102.1 |
| 10,302,744 B1 * | 5/2019 | Krishnan ................ | B60R 11/04 |
| 10,359,303 B1 * | 7/2019 | Krishnan ................ | B60R 11/04 |

(Continued)

FOREIGN PATENT DOCUMENTS

JP        2015104933 A    6/2015

*Primary Examiner* — David G Cormier
*Assistant Examiner* — Thomas Bucci
(74) *Attorney, Agent, or Firm* — Frank A. MacKenzie; Bejin Bieneman PLC (57) ABSTRACT

A sensor assembly includes a housing including a chamber; a first sensor disposed in the chamber and including a first sensor window facing outward from the chamber; a second sensor outside and fixed relative to the chamber, the second sensor including a second sensor window; a blower having a blower outlet in the chamber and having a blower inlet; and a flexible hose extending from a first end positioned to receive ambient air to a second end positioned to direct air into the blower inlet. The housing includes a first outlet from the chamber to the exterior environment, and a second outlet from the chamber to the exterior environment. The first outlet is positioned to direct air across the first sensor window, and the second outlet is positioned to direct air across the second sensor window.

17 Claims, 5 Drawing Sheets

(56) References Cited

U.S. PATENT DOCUMENTS

| | | | |
|---|---|---|---|
| 2006/0068696 A1* | 3/2006 | Ashford | G08B 29/22 454/188 |
| 2009/0250533 A1* | 10/2009 | Akiyama | B60S 1/381 239/284.1 |
| 2011/0073142 A1* | 3/2011 | Hattori | B60S 1/52 134/198 |
| 2011/0266375 A1* | 11/2011 | Ono | B60S 1/0848 239/589 |
| 2012/0162428 A1* | 6/2012 | Wee | B60S 1/56 348/148 |
| 2013/0092758 A1* | 4/2013 | Tanaka | B60S 1/52 239/284.1 |
| 2015/0040953 A1* | 2/2015 | Kikuta | B60S 1/56 134/123 |
| 2015/0151722 A1* | 6/2015 | Gokan | H04N 5/2251 134/198 |
| 2015/0183406 A1* | 7/2015 | Tanaka | B08B 3/02 134/99.1 |
| 2015/0185592 A1* | 7/2015 | Eineren | H04N 5/2252 348/375 |
| 2015/0296108 A1* | 10/2015 | Hayakawa | B60R 1/00 348/148 |
| 2017/0036647 A1* | 2/2017 | Zhao | B05B 1/04 |
| 2017/0313286 A1* | 11/2017 | Galera | B08B 3/02 |
| 2018/0015907 A1* | 1/2018 | Rice | B60S 1/56 |
| 2018/0093644 A1* | 4/2018 | Lin | B60S 1/56 |
| 2018/0186341 A1* | 7/2018 | Kimura | B60S 1/56 |
| 2018/0361997 A1* | 12/2018 | Schmidt | G02B 27/00 |
| 2019/0077377 A1* | 3/2019 | Schmidt | B60S 1/0848 |
| 2019/0126891 A1 | 5/2019 | Kondo | |
| 2019/0135239 A1 | 5/2019 | Rice | |
| 2019/0162951 A1* | 5/2019 | Leonelli, Jr. | B60S 1/52 |
| 2019/0204426 A1* | 7/2019 | Vaishnav | G01S 7/497 |
| 2019/0212174 A1* | 7/2019 | Krishnan | G01D 21/02 |
| 2019/0277949 A1* | 9/2019 | Krishnan | B60S 1/56 |
| 2019/0302449 A1* | 10/2019 | Bombini | B60R 11/04 |
| 2019/0310470 A1* | 10/2019 | Weindorf | B60S 1/56 |
| 2019/0337489 A1* | 11/2019 | Baldovino | G01N 21/15 |
| 2019/0337490 A1* | 11/2019 | Kawamura | B60S 1/0848 |
| 2020/0149933 A1* | 5/2020 | Robertson, Jr. | G02B 27/0006 |
| 2020/0171998 A1* | 6/2020 | Kondo | B60Q 1/0023 |
| 2020/0247329 A1* | 8/2020 | Robertson, Jr. | B60R 11/00 |
| 2020/0393550 A1* | 12/2020 | Hamilton | G01S 7/497 |
| 2022/0097657 A1* | 3/2022 | Matsunaga | G03B 30/00 |

\* cited by examiner

SENSOR ASSEMBLY WITH CLEANING

BACKGROUND

Autonomous vehicles include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

DETAILED DESCRIPTION

A sensor assembly includes a housing including a chamber; a first sensor disposed in the chamber and including a first sensor window facing outward from the chamber; a second sensor outside and fixed relative to the chamber, the second sensor including a second sensor window; a blower having a blower outlet in the chamber and having a blower inlet; and a flexible hose extending from a first end positioned to receive ambient air to a second end positioned to direct air into the blower inlet. The housing includes a first outlet from the chamber to the exterior environment, and a second outlet from the chamber to the exterior environment. The first outlet is positioned to direct air across the first sensor window, and the second outlet is positioned to direct air across the second sensor window.

The sensor assembly may further include a bracket fixed to the chamber inside the chamber, and the bracket may hold the first sensor. The sensor assembly may further include a liquid nozzle held by the bracket and aimed at the first sensor window.

The sensor assembly may further include a liquid nozzle held by the bracket and aimed at the second sensor window.

The housing may include a front wall, the first sensor window may be aimed through the front wall, and the first outlet may be formed of the front wall and the bracket.

The housing may include a front wall partially forming the chamber, the first sensor window may be aimed through the front wall, and the first outlet may be disposed on the front wall.

The sensor assembly may further include a third sensor outside and fixed relative to the chamber, the third sensor may include a third sensor window, the second sensor window may define a second plane, and the third sensor window may define a third plane different than the first plane. The housing may include a third outlet from the chamber to the exterior environment, and the third outlet may be positioned to direct air across the third sensor window. The third outlet may be slot-shaped.

An angle defined by the second plane and the third plane may be obtuse.

The housing may include a front wall, the first sensor window may be aimed through the front wall, the second sensor window may be aimed through the front wall, and the third sensor window may be aimed through the front wall.

The sensor assembly may further include a body panel of a vehicle to which the housing is mounted, and the housing may include a front wall on an opposite side of the housing from the body panel, and the first sensor window may be aimed through the front wall. The first end of the flexible hose may be positioned to receive ambient air from outside the body panel.

The first outlet may be slot-shaped.

The second outlet may be slot-shaped.

The first sensor may be a camera.

The second sensor may be a LIDAR sensor.

With reference to the Figures, a sensor assembly 32 for a vehicle 30 includes a housing 34 including a first chamber 36; a first sensor 38 disposed in the first chamber 36 and including a first sensor window 40 facing outward from the first chamber 36; a second sensor 42 outside and fixed relative to the first chamber 36, the second sensor 42 including a second sensor window 44; a blower 46 having a blower outlet 48 in the first chamber 36 and having a blower inlet 50; and a flexible hose 52 extending from a first end 54 positioned to receive ambient air to a second end 56 positioned to direct air into the blower inlet 50. The housing 34 includes a first outlet 58 from the first chamber 36 to the exterior environment, and a second outlet 60 from the first chamber 36 to the exterior environment. The first outlet 58 is positioned to direct air across the first sensor window 40, and the second outlet 60 is positioned to direct air across the second sensor window 44.

The sensor assembly 32 can provide an efficiently packaged collection of sensors 38, 42 and cleaning apparatus for the sensors 38, 42. The sensor assembly 32 can reduce complexity, number of components, and volume occupied compared with the same types of sensors 38, 42 located separately on the vehicle 30. The sensor assembly 32 can provide a single mechanism for simultaneously cleaning the first sensor window 40 and the second sensor window 44.

Figure 1:
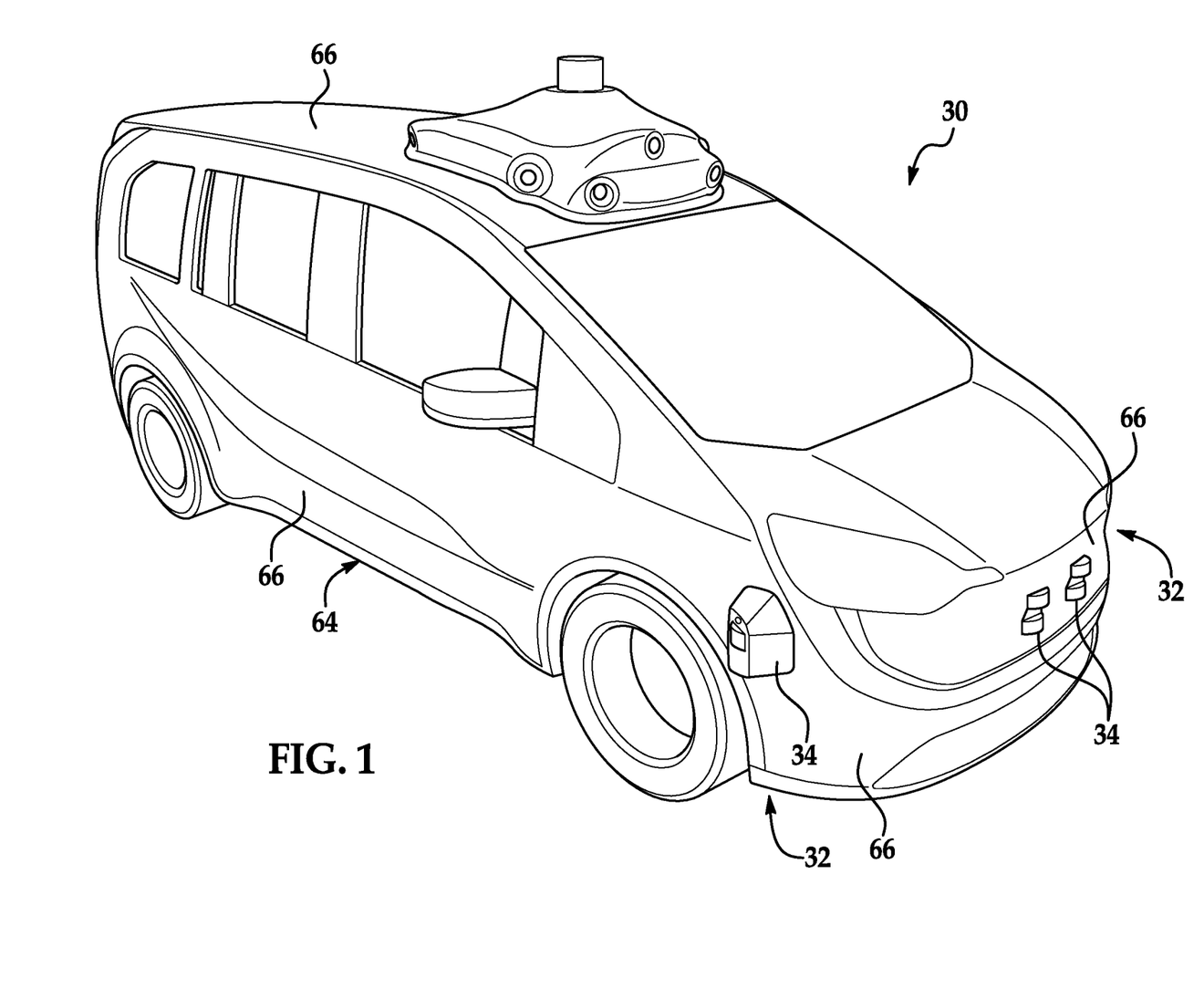
FIG. 1 is a perspective view of an example vehicle.

With reference to FIG. 1, the vehicle 30 may be any passenger or commercial automobile such as a car, a truck, a sport utility vehicle, a crossover, a van, a minivan, a taxi, a bus, etc.

The vehicle 30 may be an autonomous vehicle. A computer can be programmed to operate the vehicle 30 independently of the intervention of a human driver, completely or to a lesser degree. The computer may be programmed to operate the propulsion, brake system, steering, and/or other vehicle systems based on data from sensors such as the first sensor 38, the second sensor 42, and a third sensor 62. For the purposes of this disclosure, autonomous operation means the computer controls the propulsion, brake system, and steering without input from a human driver; semi-autonomous operation means the computer controls one or two of the propulsion, brake system, and steering and a human driver controls the remainder; and nonautonomous operation means a human driver controls the propulsion, brake system, and steering.

The vehicle 30 includes a body 64. The vehicle 30 may be of a unibody construction, in which a frame and the body 64 of the vehicle 30 are a single component. The vehicle 30 may, alternatively, be of a body-on-frame construction, in which the frame supports the body 64 that is a separate component from the frame. The frame and body 64 may be formed of any suitable material, for example, steel, aluminum, etc. The body 64 includes body panels 66 partially defining an exterior of the vehicle 30. The body panels 66 may present a class-A surface, e.g., a finished surface exposed to view by a customer and free of unaesthetic blemishes and defects.

The housing 34 is disposed on and mounted to one of the body panels 66. For example, the housing 34 can be disposed on a front end of the vehicle 30 below a beltline of the vehicle 30, as shown in FIG. 1. While the discussion below is with respect to a single sensor assembly 32, the vehicle 30 can include multiple sensor assemblies 32, each with one housing 34 disposed on one of the body panels 66. The housings 34 can be arranged to provide the respective sensors 38, 42, 62 with a collective field of view entirely around the front end of the vehicle 30.

Figure 2:
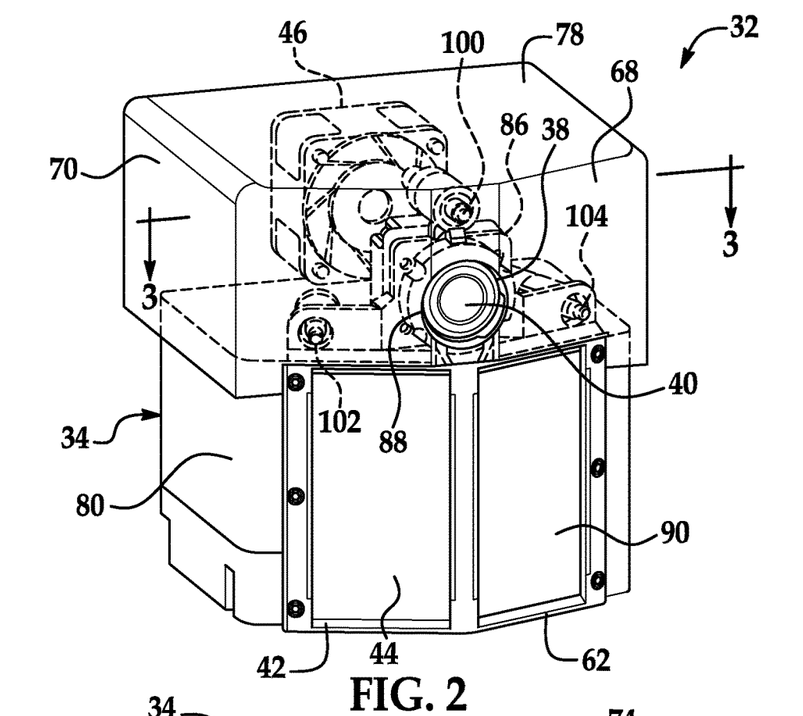
FIG. 2 is a perspective view of a sensor assembly of the vehicle with an example air distribution system and an example liquid distribution system.
Figure 3:
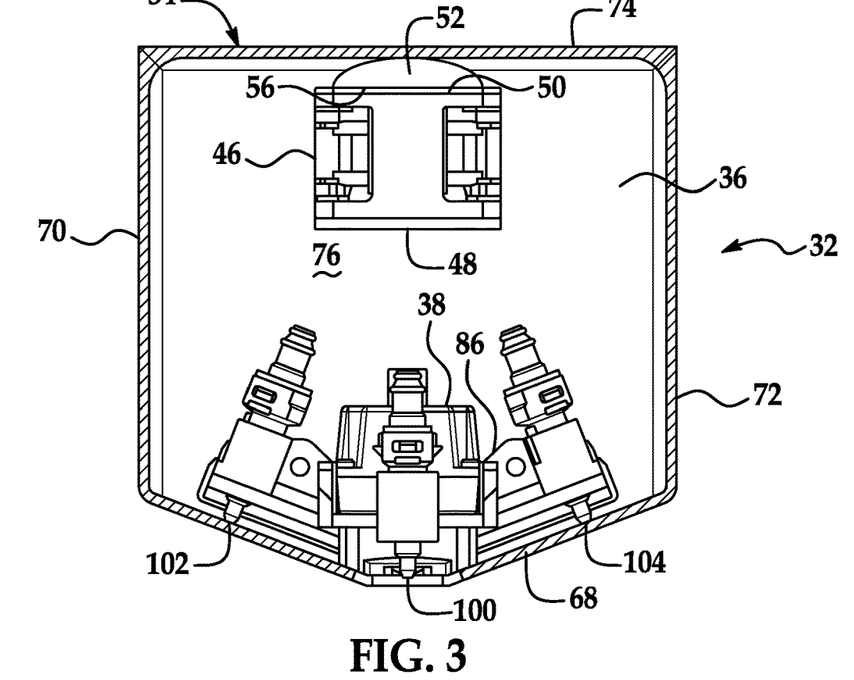
FIG. 3 is a top cross-sectional view of the sensor assembly.

With reference to FIGS. 2-3, the housing 34 includes a front wall 68, a first side wall 70, a second side wall 72, a back wall 74, a chamber floor 76, a chamber ceiling 78, and a bottom wall 82. The walls 68, 70, 72, 74 extend vertically from the bottom wall 82 to the chamber floor 76 to the chamber ceiling 78. The walls 68, 70, 72, 74, the chamber ceiling 78, and the bottom wall 82 form an exterior of the housing 34. The front wall 68 faces away from the body 64 of the vehicle 30, i.e., away from the body panel 66 to which the housing 34 is mounted, and the back wall 74 faces toward the body 64 of the vehicle 30, i.e., toward the body panel 66 to which the housing 34 is mounted. The front wall 68 is on an opposite side of the housing 34 from the body panel 66 to which the housing 34 is mounted. The first side wall 70 and second side wall 72 extend from the front wall 68 to the back wall 74. The back wall 74 extends from the first side wall 70 to the second side wall 72. The chamber floor 76, the chamber ceiling 78, and the bottom wall 82 are parallel to each other, and the first side wall 70 and the second side wall 72 are parallel to each other.

Figure 6:
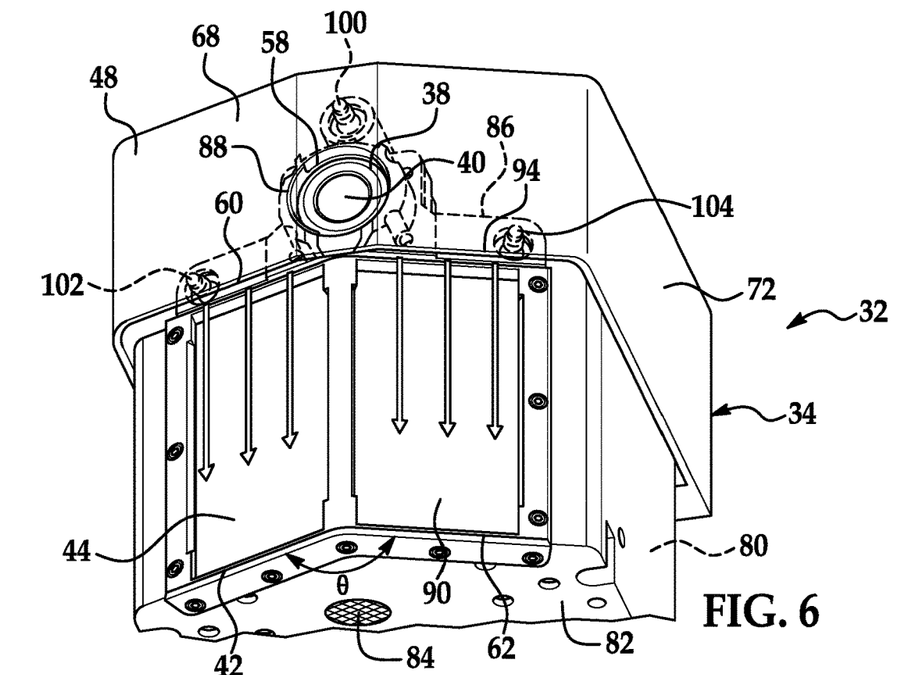
FIG. 6 is a bottom perspective view of the sensor assembly.

The housing 34 includes the first chamber 36 and a second chamber 80. The front wall 68, the first side wall 70, the second side wall 72, the back wall 74, the chamber floor 76, and the chamber ceiling 78 collectively enclose and form the first chamber 36. The first chamber 36 is located vertically above the second sensor 42 and third sensor 62. The second chamber 80 is located directly below the first chamber 36. The second chamber 80 can be formed by the chamber floor 76, the front wall 68, the first side wall 70, the second side wall 72, the back wall 74, and the bottom wall 82 (as shown in FIG. 6). The second chamber 80 is vertically below the first sensor 38. The first chamber 36 and the second chamber 80 are fluidly isolated from each other except through the exterior environment.

The blower 46 includes the blower inlet 50 and the blower outlet 48. The blower outlet 48 is located in the first chamber 36. The blower 46 draws in air from the flexible hose 52 through the blower inlet 50 and expels air into the first chamber 36 through the blower outlet 48. The blower 46 is any suitable type of blower, e.g., a fan-type blower, etc.

Figure 4:
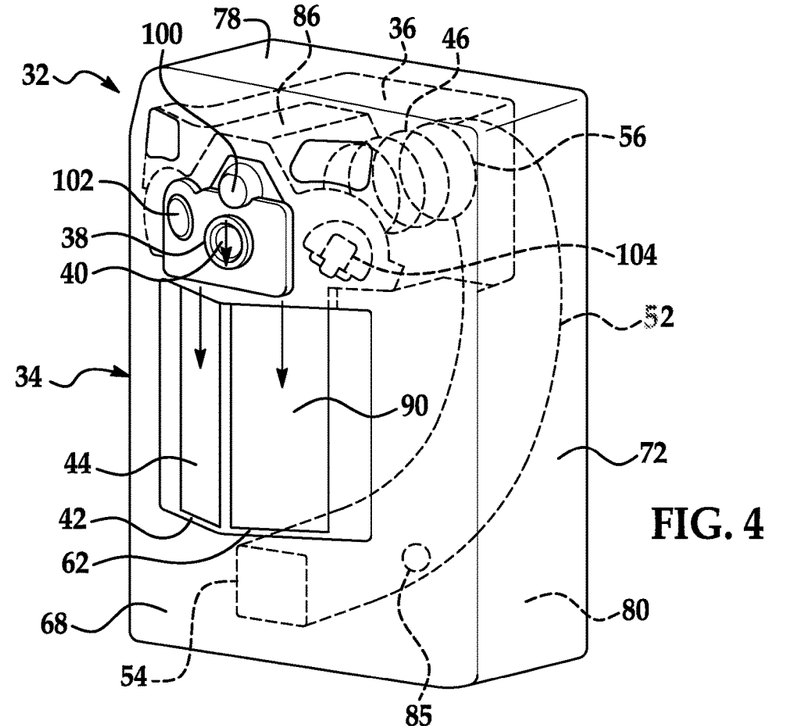
FIG. 4 is a perspective view of the sensor assembly.

With reference to FIG. 4, the flexible hose 52 extends from the first end 54 to the second end 56. The flexible hose 52 is a tube shape elongated from the first end 54 to the second end 56, allowing gas to flow from the first end 54 to the second end 56 or vice versa. The first end 54 is positioned to receive ambient air from the exterior environment. For example, the first end 54 is positioned in the second chamber 80, and the bottom wall 82 includes a housing inlet 84 from the exterior environment to the second chamber 80, as shown in FIG. 6. The housing inlet 84 can be covered by a grate or filter. The second end 56 is positioned to direct air into the blower inlet 50, e.g., is connected directly to and covers the blower inlet 50.

The flexible hose 52 is flexible relative to the housing 34, i.e., is formed of a material that elastically deforms more for a given application of force than the material forming the housing 34. For example, the flexible hose 52 can be formed of an elastomeric material and/or a plastic. The flexible hose 52 can have a layered structure, e.g., braiding or fabric embedded in a matrix material such as plastic.

The flexible hose 52 includes a drain hole 85. The drain hole 85 permits moisture in the flexible hose 52 to drain from the flexible hose 52 via gravity to the second chamber 80, where the moisture can drain via, e.g., the housing inlet 84. The drain hole 85 is located closer to the first end 54 than the second end 56 along the flexible hose 52. The drain hole 85 is located at a lowermost point of a cross-section of the flexible hose 52 at which the drain hole 85 is located.

Returning to FIGS. 2 and 3, a bracket 86 is disposed inside the first chamber 36. The bracket 86 is fixed to the first chamber 36, e.g., to the chamber floor 76 and/or the front wall 68. For example, the bracket 86 can be bolted to an inside of the front wall 68.

Figure 5:
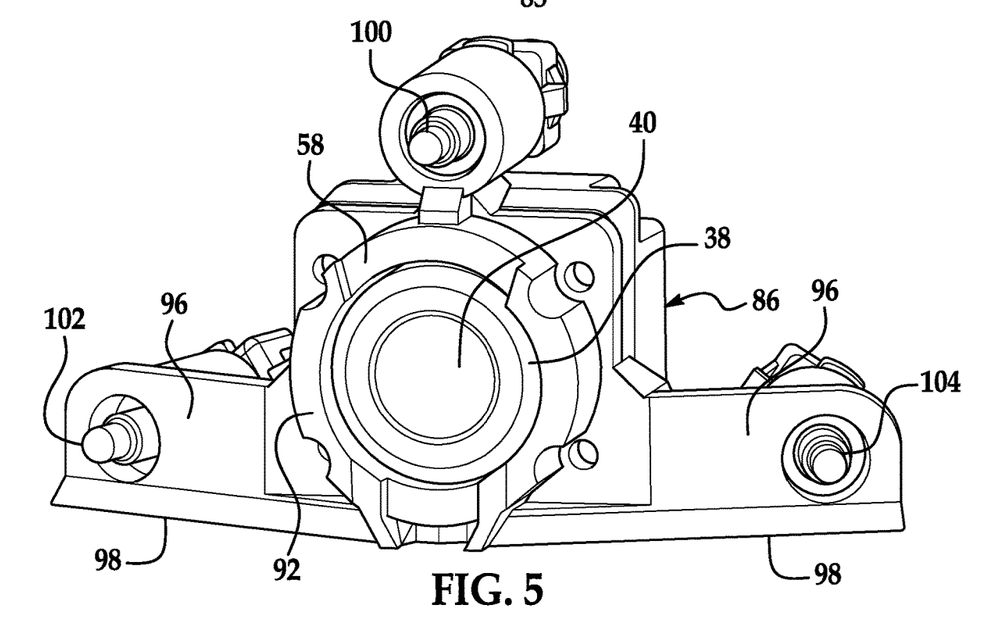
FIG. 5 is a perspective view of a bracket of the sensor assembly with a sensor and nozzles.

With reference to FIG. 5, the bracket 86 holds the first sensor 38. For example, the first sensor 38 can be press-fit into an opening through the bracket 86. The bracket 86 fixes the position of the first sensor 38 relative to the housing 34. The first sensor 38 is disposed in the first chamber 36.

The first sensor 38 detects the external world, e.g., objects and/or characteristics of surroundings of the vehicle 30, such as other vehicles, road lane markings, traffic lights and/or signs, pedestrians, etc. For example, the first sensor 38 can be a radar sensor, a scanning laser range finder, a light detection and ranging (LIDAR) device, or an image processing sensor such as a camera. In particular, the first sensor 38 can be a camera.

The first sensor 38 includes the first sensor window 40. The first sensor window 40 faces outward from the first chamber 36 through the front wall 68, i.e., the first sensor window 40 is aimed through the front wall 68, e.g., through a first opening 88 in the front wall 68, as shown in FIGS. 2 and 6. The first sensor window 40 can be, e.g., a camera lens.

With reference to FIG. 6, the second sensor 42 and the third sensor 62 are disposed in the housing 34 and outside the first chamber 36. For example, the second sensor 42 and the third sensor 62 are disposed below the chamber floor 76 in the second chamber 80. The second sensor 42 and the third sensor 62 are fixed relative to the first chamber 36 and second chamber 80 of the housing 34. The second sensor 42 and the third sensor 62 can be disposed laterally from each other with respect to the housing 34, i.e., disposed along a line perpendicular to the direction that the first sensor 38 is aimed and parallel to the chamber floor 76.

The second sensor 42 and third sensor 62 detect the external world, e.g., objects and/or characteristics of surroundings of the vehicle 30, such as other vehicles, road lane markings, traffic lights and/or signs, pedestrians, etc. For example, the second sensor 42 and third sensor 62 can be radar sensors, scanning laser range finders, light detection and ranging (LIDAR) devices, or image processing sensors such as cameras. In particular, the second sensor 42 and third sensor 62 can be LIDAR sensors, e.g., scanning LIDAR devices. A LIDAR device detects distances to objects by emitting laser pulses at a particular wavelength and measuring the time of flight for the pulse to travel to the object and back.

The second sensor 42 includes the second sensor window 44, and the third sensor 62 includes a third sensor window 90. The second sensor window 44 and third sensor window 90 are fixed relative to the first sensor window 40 and relative to each other. The second sensor window 44 and third sensor window 90 are positioned below the first chamber 36, e.g., in the second chamber 80. The second sensor window 44 and third sensor window 90 extend from the chamber floor 76 away from the first chamber 36. The second sensor window 44 is aimed through the front wall 68, and the third sensor window 90 is aimed through the front wall 68.

The second sensor window 44 has a flat rectangular shape and defines a first plane. The third sensor window 90 has a flat rectangular shape and defines a second plane different than the first plane. An angle θ defined by the second sensor window 44 and the third sensor window 90, i.e., an angle θ at which the first plane and the second plane would horizontally intersect, is obtuse.

The housing 34 includes the first outlet 58 from the first chamber 36 to the exterior environment. The first outlet 58 is disposed on the front wall 68 and positioned to direct air across the first sensor window 40. The first outlet 58 is slot-shaped. The first outlet 58 is formed of the front wall 68 and the bracket 86. The bracket 86 includes a lip 92 positioned flush against the front wall 68 and extending partially around the first opening 88. The first outlet 58 is a gap in the lip 92. If the first opening 88 has a circular shape, the lip 92 may extend approximately 270° around the first opening 88, e.g., the along the sides and bottom of the first opening 88, and the first outlet 58 may extend approximately the other 90° around the first opening 88, e.g., the top of the first opening 88.

The housing 34 includes the second outlet 60 and a third outlet 94 from the first chamber 36 to the exterior environment. The second outlet 60 is positioned to direct air across the second sensor window 44, and the third outlet 94 is positioned to direct air across the third sensor window 90. The second outlet 60 and third outlet 94 are slot-shaped. The second outlet 60 and third outlet 94 are formed of the front wall 68 and the bracket 86. The bracket 86 includes front surfaces 96 each extending parallel to the front wall 68 and defining a constant-width gap with the front wall 68. The bracket 86 includes ramps 98 angled from the front surfaces 96 toward the front wall 68 at a bottom of the bracket 86 and defining a narrower gap with the front wall 68 than the constant-width gap. The second outlet 60 is formed of the ramp 98 and the front wall 68 directly above the second sensor window 44, and the third outlet 94 is formed of the ramp 98 and the front wall 68 directly above the third sensor window 90. The second outlet 60 extends along an entirety of a width of the second sensor window 44, and the third outlet 94 extends along an entirety of a width of the third sensor window 90.

The operation of the blower 46 pushes air from the flexible hose 52 into the first chamber 36. The blower 46 thus draws air from the exterior environment into the second chamber 80 and then the flexible hose 52 via the housing inlet 84. The blower 46 raises the air pressure of the first chamber 36 above the air pressure of the exterior environment, i.e., above the ambient air pressure. The higher air pressure forces air out the first outlet 58, the second outlet 60, and the third outlet 94, providing air curtains across the first sensor window 40, the second sensor window 44, and the third sensor window 90. The air curtains can push debris off of the sensor windows 40, 44, 90 and can prevent debris from contacting the sensor windows 40, 44, 90.

With continued reference to FIG. 6, in a first example of providing liquid such as washer fluid to the sensor windows 40, 44, 90, the sensor assembly 32 includes a first liquid nozzle 100, a second liquid nozzle 102, and a third liquid nozzle 104. The liquid nozzles 100, 102, 104 are held by the bracket 86 and extend through the front wall 68. For example, the liquid nozzles 100, 102, 104 can be attached to the bracket 86 with a press fit or a snap fit. The first liquid nozzle 100 is disposed above the first sensor 38 and aimed at the first sensor window 40. The second liquid nozzle 102 and third liquid nozzle 104 are disposed laterally from the first sensor 38 and extend from the front surfaces 96 of the bracket 86. The second liquid nozzle 102 is disposed above the second sensor 42 and aimed at the second sensor window 44, and the third liquid nozzle 104 is disposed above the third sensor 62 and aimed at the third sensor window 90.

Figure 7:
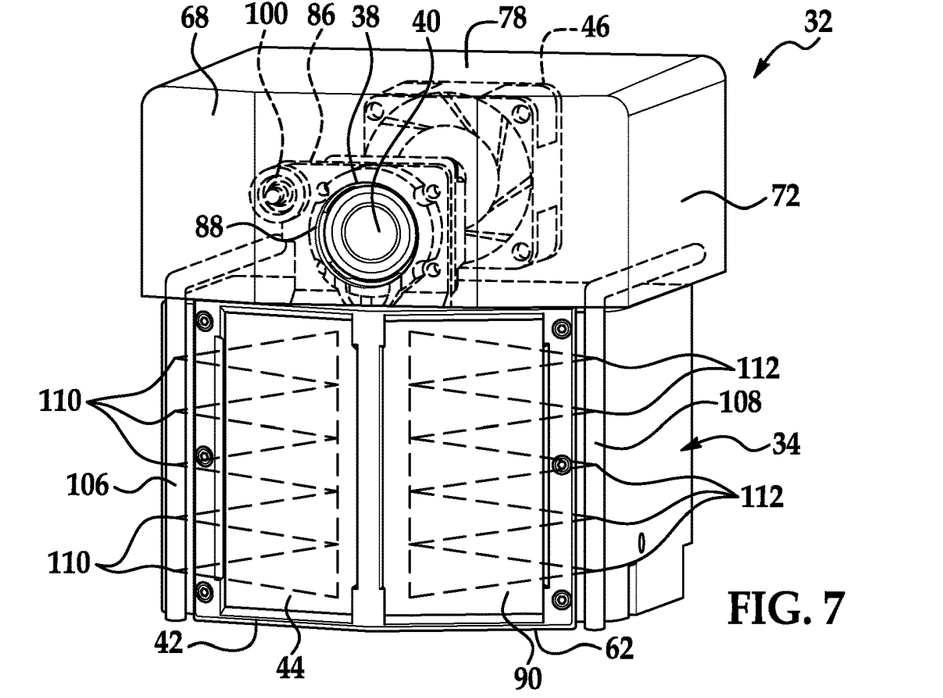
FIG. 7 is a perspective view of the sensor assembly with another example liquid distribution system.

With reference to FIG. 7, in a second example of providing liquid to the sensor windows 40, 44, 90, the sensor assembly 32 includes the first liquid nozzle 100, a second tube 106, and a third tube 108. (The term "first tube" is skipped so that the naming of the tubes is consistent with the naming of the second sensor window 44 and third sensor window 90.) The first liquid nozzle 100 is held by the bracket 86 and extends through the front wall 68. For example, the first liquid nozzle 100 can be attached to the bracket 86 with a press fit or a snap fit. The first liquid nozzle 100 is disposed above and laterally of the first sensor 38 and aimed at the first sensor window 40.

The second tube 106 extends along an edge of the second sensor window 44, e.g., an edge farthest from the third sensor window 90, and the third tube 108 extends along an edge of the third sensor window 90, e.g., an edge farthest from the second sensor window 44. The second tube 106 includes a plurality of second liquid outlets 110 aimed at the second sensor window 44, and the third tube 108 includes a plurality of third liquid outlets 112 aimed at the third sensor window 90. The second and third liquid outlets 110, 112 are arranged in sequence along the second and third tubes 106, 108, respectively.

Figure 8:
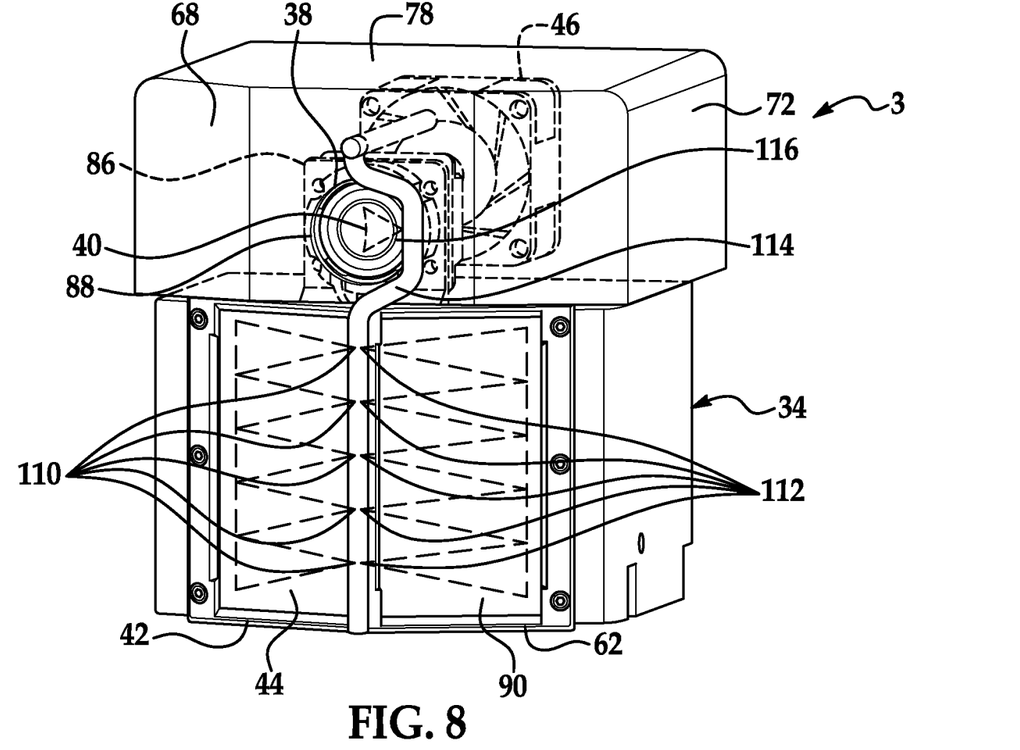
FIG. 8 is a perspective view of the sensor assembly with another example liquid distribution system.

With reference to FIG. 8, in a third example of providing liquid to the sensor windows 40, 44, 90, the sensor assembly 32 includes a single tube 114. The tube 114 extends partially along the first opening 88 and along parallel adjacent edges of the second sensor window 44 and third sensor window 90. In particular, the same section of the tube 114 extends along an edge of the second sensor window 44 nearest the third sensor window 90 and along an edge of the third sensor window 90 nearest the second sensor window 44. The tube 114 includes a plurality of first liquid outlets 116 aimed at the first sensor window 40, a plurality of second liquid outlets 110 aimed at the second sensor window 44, and a plurality of third liquid outlets 112 aimed at the third sensor window 90. The second liquid outlets 110 and third liquid outlets 112 are arranged in sequence on opposite side of the same section of the tube 114.

The disclosure has been described in an illustrative manner, and it is to be understood that the terminology which has been used is intended to be in the nature of words of description rather than of limitation. The adjectives "first," "second," and "third" are used throughout this document as identifiers and are not intended to signify importance, order, or quantity. Many modifications and variations of the present disclosure are possible in light of the above teachings, and the disclosure may be practiced otherwise than as specifically described.

What is claimed is:

1. A sensor assembly comprising:
   a housing including a chamber;
   a first sensor disposed in the chamber and including a first sensor window facing outward from the chamber;
   a second sensor outside and fixed relative to the chamber, the second sensor including a second sensor window;
   a blower having a blower outlet in the chamber and having a blower inlet; and
   a flexible hose extending from a first end positioned to receive ambient air to a second end positioned to direct air into the blower inlet;
   wherein the housing includes a first outlet from the chamber to the exterior environment, and a second outlet from the chamber to the exterior environment;
   the first outlet is positioned to direct air across the first sensor window; and
   the second outlet is positioned to direct air across the second sensor window.

2. The sensor assembly of claim 1, further comprising a bracket fixed to the chamber inside the chamber, wherein the bracket holds the first sensor.

3. The sensor assembly of claim 2, further comprising a liquid nozzle held by the bracket and aimed at the first sensor window.

4. The sensor assembly of claim 2, further comprising a liquid nozzle held by the bracket and aimed at the second sensor window.

5. The sensor assembly of claim 2, wherein the housing includes a front wall, the first sensor window is aimed through the front wall, and the first outlet is formed of the front wall and the bracket.

6. The sensor assembly of claim 1, wherein the housing includes a front wall partially forming the chamber, the first sensor window is aimed through the front wall, and the first outlet is disposed on the front wall.

7. The sensor assembly of claim 1, further comprising a third sensor outside and fixed relative to the chamber, the third sensor including a third sensor window, wherein the second sensor window defines a second plane, and the third sensor window defines a third plane different than the first plane.

8. The sensor assembly of claim 7, wherein the housing includes a third outlet from the chamber to the exterior environment, and the third outlet is positioned to direct air across the third sensor window.

9. The sensor assembly of claim 8, wherein the third outlet is slot-shaped.

10. The sensor assembly of claim 7, wherein an angle defined by the second plane and the third plane is obtuse.

11. The sensor assembly of claim 7, wherein the housing includes a front wall, the first sensor window is aimed through the front wall, the second sensor window is aimed through the front wall, and the third sensor window is aimed through the front wall.

12. The sensor assembly of claim 1, further comprising a body panel of a vehicle to which the housing is mounted, wherein the housing includes a front wall on an opposite side of the housing from the body panel, and the first sensor window is aimed through the front wall.

13. The sensor assembly of claim 12, wherein the first end of the flexible hose is positioned to receive ambient air from outside the body panel.

14. The sensor assembly of claim 1, wherein the first outlet is slot-shaped.

15. The sensor assembly of claim 1, wherein the second outlet is slot-shaped.

16. The sensor assembly of claim 1, wherein the first sensor is a camera.

17. The sensor assembly of claim 1, wherein the second sensor is a LIDAR sensor.

* * * * *